Patented Apr. 23, 1946

2,398,861

UNITED STATES PATENT OFFICE 2,398,861

LACTONES OF THE SATURATED AND UNSATURATED CYCLOPENTANOPOLYHYDROPHENANTHRENE SERIES AND PROCESS OF PREPARING SAME

Leopold Ruzicka, Zurich, Switzerland, assignor to Ciba Pharmaceutical Products, Incorporated, Summit, N. J., a corporation of New Jersey No Drawing. Application April 29, 1942, Serial No. 441,034. In Switzerland June 10, 1941

11 Claims. (Cl. 260—239.5)

This invention relates to the manufacture of lactones of the saturated and unsaturated cyclopentanopolyhydrophenanthrene-series by condensing hydroxy methylene derivatives of the general formula

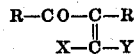

wherein one of the two R's stands for a radical containing the cyclopentanopolyhydrophenanthrene-ring structure, the other R is a member of the group consisting of hydrogen or a hydrocarbon radical, such as alkyl, X stands for hydrogen, a free or functionally moderated carboxylic acid group, and Y is a free, esterified or etherified hydroxyl group, with a functional derivative of a halogen fatty acid, such as an α- or β-halogenated fatty acid ester, amide or nitrile, and if desired subjecting the condensation product to the action of hydrolyzing and lactonizing agents or to a re-esterifying treatment and/or a treatment for splitting off water.

The parent materials can be obtained for example from side chains ketones or aldehydes of the cyclopentanopolyhydrophenanthrene series, such as Δ⁵-3-acetoxy-pregnene-20-one, Δ⁵-3-hydroxy-21-methyl-pregnene-20-one, Δ⁵-3-hydroxy-pregnene-21-al, Δ⁵-3-acetoxy-21-methyl-pregnene-20-one or 3:7:12-triacetoxy-pregnane-20-one, in a manner known in itself by condensation with functional derivatives of formic acid or oxalic acid, for example in the presence of alkali metals or their alcoholates or amides. In most cases, the hydroxymethylene compounds thus obtained need not be purified, and they can be converted directly into their esters or ethers, preferably in the form of their enol salts.

The condensation with halogen fatty acid derivatives may be effected in known manner by means of metals, such as zinc or magnesium, in a suitable inert solvent, for instance benzene, toluene, dioxane or ether. Lactonization generally occurs during the condensation and also frequently a partial elimination of water. When lactonization takes place only with difficulty a treatment with reesterifying or hydrolyzing and lactonizing agents may be advantageous. In many instances one obtains mixtures which may be separated into their constituents or further worked up as mixtures. Thus if desired the condensation product may be subjected to the known treatments for eliminating water, of which distillation or sublimation under diminished pressure has proved especially useful, if desired after admixture with surface-active substances, for instance aluminium oxide, silica gel, active carbon, fuller's earth or with an anhydrous salt, for instance copper sulfate. When the substituent X has been a free or a functionally moderated carboxylic acid group, such as an esterified carboxylic acid group, a nitrile or amide group, the products obtained may be subsequently subjected to the action of decarboxylating means, for instance heat. For isolating pure components the mixture produced of lactones may be treated in the usual manner, for instance by fractional crystallization or by chromatographic adsorption analysis.

The described reactions can be illustrated, for example as follows:

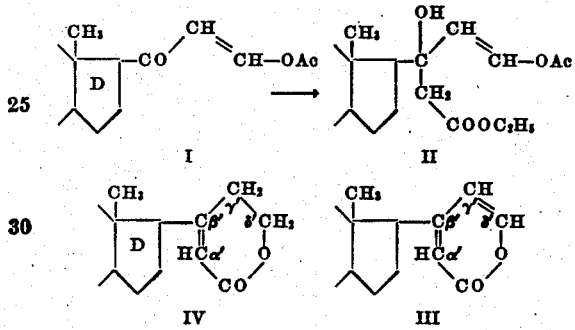

If in the above schedule for example the hydroxymethylene compound I is subjected for instance to a catalytic hydrogenation, a mono unsaturated lactone (for example of the Formula IV) is obtained as final product. The treatment with reducing agents, however, may also take place at any other stage of the process.

The products obtained by this process are 6- or more membered saturated hydroxylactones or unsaturated lactones of the cyclopentanopolyhydrophenanthrene-series. They may possess between the lactone ring and the cyclopentanopolyhydrophenanthrene nucleus an aliphatic radical, for instance an alkylene group. The six-membered unsaturated lactones represent α-pyrones carrying for example in α'-, β'- or γ'- position a radical which contains the cyclopentanopolyhydrophenanthrene frame and which, furthermore, may be substituted by a hydrocarbon radical, such as alkyl, and also partially hydrogenated.

The following examples illustrate the invention but are not to be regarded as limiting it in any way:

Example 1

3.5 grams of $\Delta^{5:6}$-3-acetoxy-21-acetoxymethylenepregnene-20-one of the formula

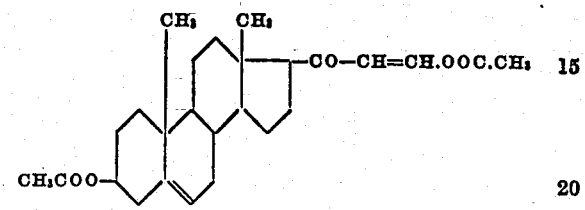

(prepared for example by the action of amylformate and potassium methylate in a benzene solution on $\Delta^{5:6}$-3-acetoxy-pregnene-20-one and subsequent acetylation by means of acetylchloride) are dissolved in benzene, mixed with 2 grams of zinc spangles and heated with 4.8 grams of ethyl bromoacetate until the reaction is complete. The reaction mixture is now largely concentrated, the residue diluted with absolute alcohol, the solution filtered to remove the zinc mud and then poured into dilute hydrochloric acid. The reaction products which have precipitated are boiled for a short time with little alcohol containing hydrochloric acid and then suction-filtered. The products are further purified by chromatographic adsorption. As main product there is obtained $\Delta^{5:6:20:22}$-3-acetoxy-21-hydroxymethylene-nor-choladienic acid lactone ($\beta'[\Delta^{5:6}$-3-acetoxyandrostenyl-(17)]-pentadienolide) of the formula

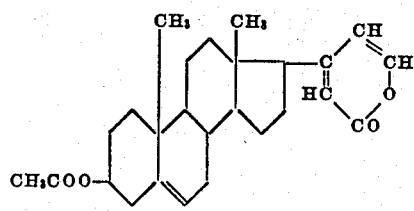

In addition there is also formed $\Delta^{5:6:20:22}$-3-hydroxy-21-hydroxymethylene-nor-choladienic acid lactone of the formula

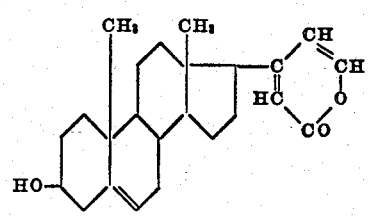

In order to complete the elimination of water from the primarily formed hydroxy-compound, a high vacuum sublimation effected prior to the chromatography has proved advantageous. This may also serve for splitting off a carboxyl group from the final product, if for example $\Delta^{5:6}$-3-acetoxy-21-carbethoxy-acetoxy-methylene-pregnene-20-one has been used as starting material. In this case the condensation product is previously subjected to an energetic hydrolysis.

If, as a first stage, a catalytic hydrogenation to the $\Delta^{5:6}$-3-acetoxy-21-acetoxymethyl-preg-nene-20-one has been effected, or if a hydrogenation has been carried out at any desired stage, the $\Delta^{5:6:20:22}$-3-hydroxy-21-hydroxymethyl-nor-choladienic acid lactone of the formula

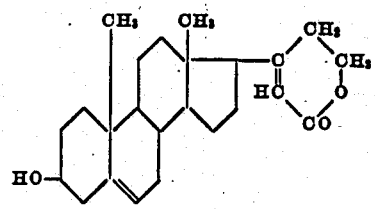

or its 3-acetate may be obtained in analogous manner.

When using an $\alpha$-halogenpropionic ester or an $\alpha$-halogenpropionic nitrile or -diethylamide instead of a halogen acetic ester, there is obtained $\alpha'$-methyl-$\beta'$-[$\Delta^5$-acetoxy-androstenyl-(17)]-pentadienolide of the formula

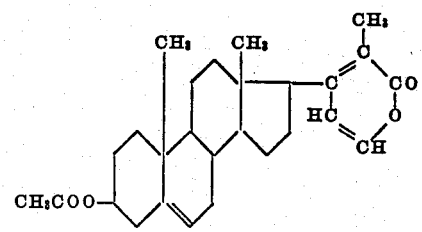

Example 2

5 grams of the condensation mixture obtained by the action of $\Delta^{5:6}$-3-acetoxy-17[17$^2$-oxo-propyl]-androstene with oxalic ester and subsequent acetylation, are caused to react in benzene-dioxane with 10 grams of activated zinc spangles and 15 grams of ethyl bromoacetate. When the reaction has ceased, the reaction mixture is diluted with absolute alcohol and the solution is filtered to remove the unchanged zinc. Some concentrated hydrochloric acid is added to the solution and the alcohol is largely concentrated. The reaction products are taken up in ether, washed thoroughly with water and subjected to a distillation in a high vacuum. The feebly colored distillate is purified by chromatographing or recrystallizing. There is obtained $\gamma'[\Delta^{5:6}$-3-hydroxy-androstenyl-(17)]-$\beta'$-methyl-pentadienolide ($\Delta^{5:6:20:21:22:23}$-3:21-dihydroxy-22-methyl-cholatrienic acid lactone) of the formula

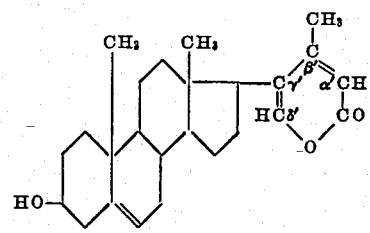

In addition there is formed $\beta'[\Delta^5$-3-hydroxy-21-nor-pregnenyl-(20)]-pentadienolide of the formula

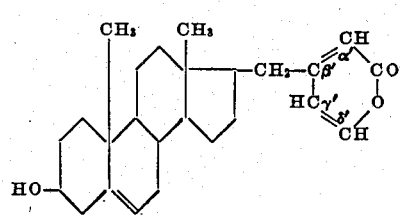

The reaction scheme of the foregoing example may be graphically represented as follows:

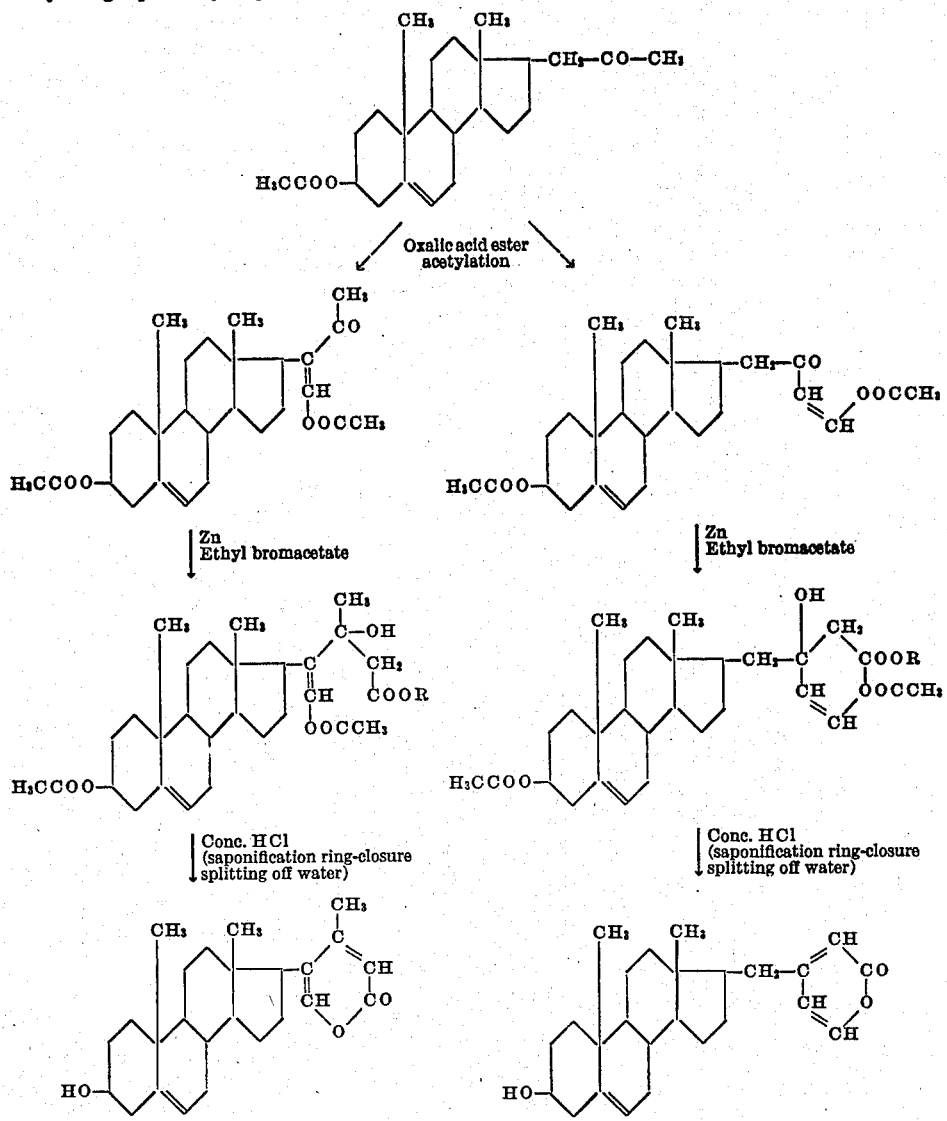

What I claim is:

1. A process for the manufacture of lactones of the saturated and unsaturated cyclopentanopolyhydrophenanthrene series, comprising treating a hydroxy methylene derivative of the general formula

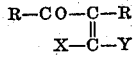

wherein one of the two R's is a radical containing the cyclopentanopolyhydrophenanthrene ring structure, the other R is a member of the group consisting of hydrogen and a hydrocarbon radical, X stands for a member of the group consisting of hydrogen and carboxylic acid ester, amide and nitrile groups, and Y is a member of the group consisting of a free and esterified hydroxyl group, with a member of the group consisting of α- and β-halogenated fatty acid esters, amides and nitriles.

2. A process for the manufacture of lactones of the saturated and unsaturated cyclopentanopolyhydrophenanthrene series, comprising treating a hydroxy methylene derivative of the general formula

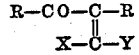

wherein one of the two R's is a radical containing the cyclopentanopolyhydrophenanthrene ring structure, the other R is a member of the group consisting of hydrogen and a hydrocarbon radical, X stands for a member of the group consisting of hydrogen and carboxylic acid ester, amide and nitrile groups, and Y is a member of the group consisting of a free and esterified hydroxyl group, with an ester of an α-halogen fatty acid.

3. A process for the manufacture of lactones of the saturated and unsaturated cyclopentanopolyhydrophenanthrene series, comprising treating a hydroxy methylene derivative of the general formula

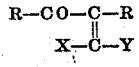

wherein one of the two R's is a radical containing the cyclopentanopolyhydrophenanthrene ring structure, the other R is a member of the group consisting of hydrogen and a hydrocarbon radical, X stands for a member of the group consisting of hydrogen and a carboxylic acid ester, amide and nitrile groups, and Y is a member of the group consisting of a free and esterified hydroxyl group, with ethylbromacetate.

4. A process for the manufacture of lactones of the saturated and unsaturated cyclopentanopolyhydrophenanthrene series, comprising treating a hydroxy methylene derivative of the general formula

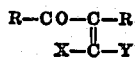

wherein one of the two R's is a radical containing the cyclopentanopolyhydrophenanthrene ring structure, the other R is a member of the group consisting of hydrogen and a hydrocarbon radical, X stands for a member of the group consisting of hydrogen and carboxylic acid ester, amide and nitrile groups, and Y is a member of the group consisting of a free and esterified hydroxyl group, with a member of the group consisting of $\alpha$- and $\beta$-halogenated fatty acid esters, amides and nitriles, and then subjecting the condensation product to a process for eliminating water.

5. A process for the manufacture of lactones of the saturated and unsaturated cyclopentanopolyhydrophenanthrene series, comprising treating a hydroxy methylene derivative of the general formula

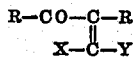

wherein one of the two R's is a radical containing the cyclopentanopolyhydrophenanthrene ring structure, the other R is a member of the group consisting of hydrogen and a hydrocarbon radical, X stands for a member of the group consisting of hydrogen and carboxylic acid ester, amide and nitrile groups, and Y is a member of the group consisting of a free and esterified hydroxyl group, with a member of the group consisting of $\alpha$- and $\beta$-halogenated fatty acid esters, amides and nitriles, and then subjecting the condensation product to the action of members of the group consisting of re-esterifying, hydrolizing and lactonizing agents and decarboxylating means.

6. A process for the manufacture of lactones of the saturated and unsaturated cyclopentanopolyhydrophenanthrene series, comprising treating a hydroxy methylene derivative of the general formula

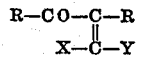

wherein one of the two R's is a radical containing the cyclopentanopolyhydrophenanthrene ring structure, the other R is a member of the group consisting of hydrogen and a hydrocarbon radical, X stands for a member of the group consisting of hydrogen and carboxylic acid ester, amide and nitrile groups, and Y is a member of the group consisting of a free and esterified hydroxyl group, with a member of the group consisting of $\alpha$- and $\beta$-halogenated fatty acid esters, amides and nitriles, subjecting the condensation product to the action of members of the group consisting of re-esterifying, hydrolyzing and lactonizing agents and decarboxylating means, and then to a process for eliminating water.

7. A process according to claim 1, wherein there is carried out as additional step a treatment with a hydrogenating agent.

8. The compounds selected from the group consisting of $\alpha$-pyrones and partially hydrogenated $\alpha$-pyrones which are substituted by a radical containing a cyclopentanopolyhydrophenanthrene ring structure free from nuclear tertiary hydroxyl groups, and which severally correspond to the following formulae:

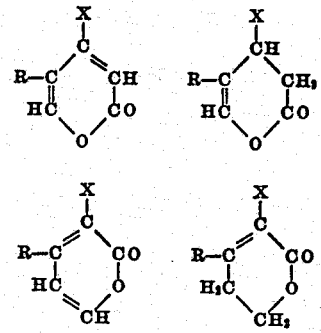

wherein R represents the aforesaid radical and X represents a hydrocarbon radical.

9. The compounds selected from the group consisting of $\alpha$-pyrones and partially hydrogenated $\alpha$-pyrones which are substituted by a radical containing the cyclopentanopolyhydrophenanthrene ring structure and which contain a hydrocarbon radical substituent in one of the positions $\alpha'$ and $\beta'$ on the lactone ring, the latter being otherwise free from substituents, and the linkage between the first-mentioned radical and the lactone ring being a direct carbon-to-carbon linkage.

10. $\alpha$-pyrones which are substituted in $\gamma'$-position by a radical containing the cyclopentanopolyhydrophenanthrene ring structure and which contain a hydrocarbon radical substituent in one of the positions $\alpha'$ and $\beta'$ on the lactone ring, the latter being otherwise free from substituents, and the linkage between the first-mentioned radical and the lactone ring being a direct carbon-to-carbon linkage.

11. The $\gamma'$-substituted $\alpha$-pyrone of the formula

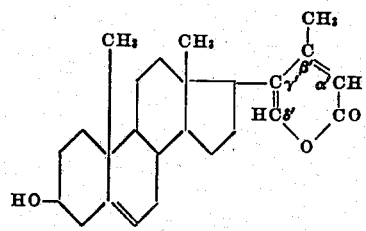

LEOPOLD RUZICKA.

Certificate of Correction

Patent No. 2,398,861.     LEOPOLD RUZICKA     April 23, 1946.

It is hereby certified that error appears in the printed specification of the above numbered patent requiring correction as follows: Page 3, second column, approximately line 30, Example 2, for the right-hand portion of the formula reading

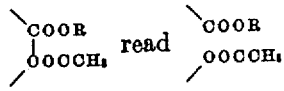

and that the said Letters Patent should be read with this correction therein that the same may conform to the record of the case in the Patent Office.

Signed and sealed this 30th day of July, A. D. 1946.

[SEAL]

LESLIE FRAZER,
*First Assistant Commissioner of Patents.*